2 Sheets--Sheet 1.

F. A. HUNTINGTON.

Shingle-Machines.

No. 6,082. Reissued Oct. 13, 1874.

Witnesses:

Geo A Mauntz
Wm Smith

Inventor:

F A Huntington
By his Attys
A.H. Evans & Co

THE GRAPHIC CO. PHOTO-LITH. 39 & 41 PARK PLACE, N.Y.

2 Sheets--Sheet 2.

F. A. HUNTINGTON.

Shingle-Machines.

No. 6,082. Reissued Oct. 13, 1874.

Witnesses:

Geo A Mantby
C. M. Smith

Inventor:

F. A. Huntington
By his Attys.
A. H. Evans & Co

THE GRAPHIC CO. PHOTO-LITH. 39 & 41 PARK PLACE, N.Y.

UNITED STATES PATENT OFFICE.

FRANK A. HUNTINGTON, OF SAN FRANCISCO, CALIFORNIA.

IMPROVEMENT IN SHINGLE-MACHINES.

Specification forming part of Letters Patent No. 122,117, dated December 26, 1871; reissue No. 6,082, dated October 13, 1874; application filed July 24, 1874.

*To all whom it may concern:*

Be it known that I, FRANK A. HUNTINGTON, of San Francisco, State of California, have invented certain new and useful Improvements in Shingle-Machines; and I do hereby declare the following description and accompanying drawings are sufficient to enable anybody skilled in the art or service to which it most nearly appertains to make and use my said invention or improvements without further invention or experiment.

The object of my invention is to provide an improved machine for making sawed shingles, so constructed that, by means of springs, it shall hold the block to be cut firmly, and with nearly the same pressure at both sides, whether the upper and lower faces be parallel or otherwise.

To more fully illustrate and explain my invention, reference is had to the accompanying drawings and letters of reference, forming part of this specification, in which—

Figure 1:
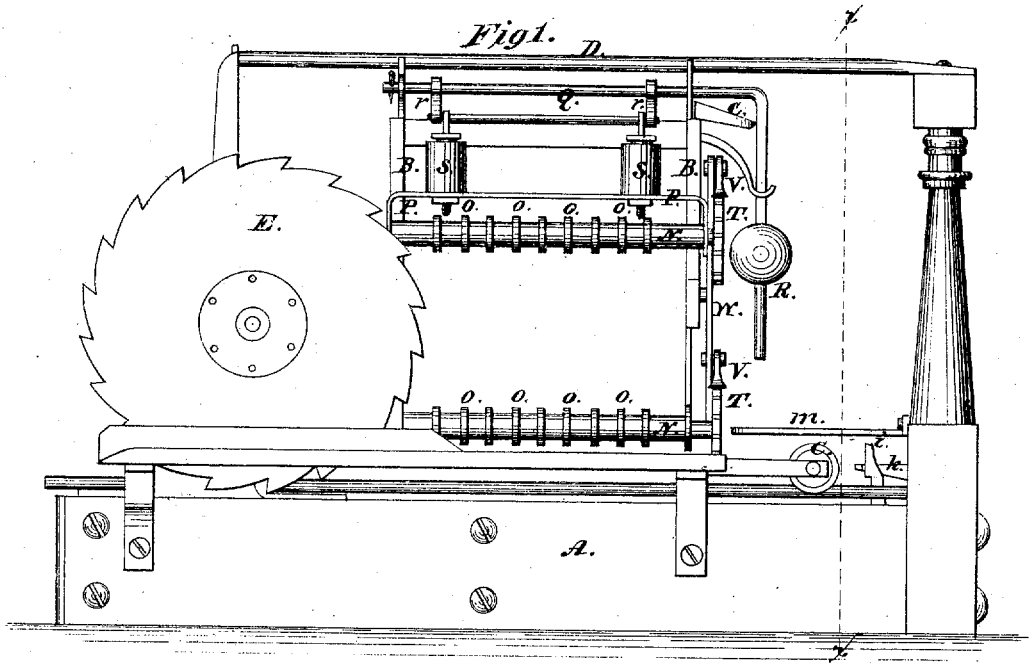
Figure 2:
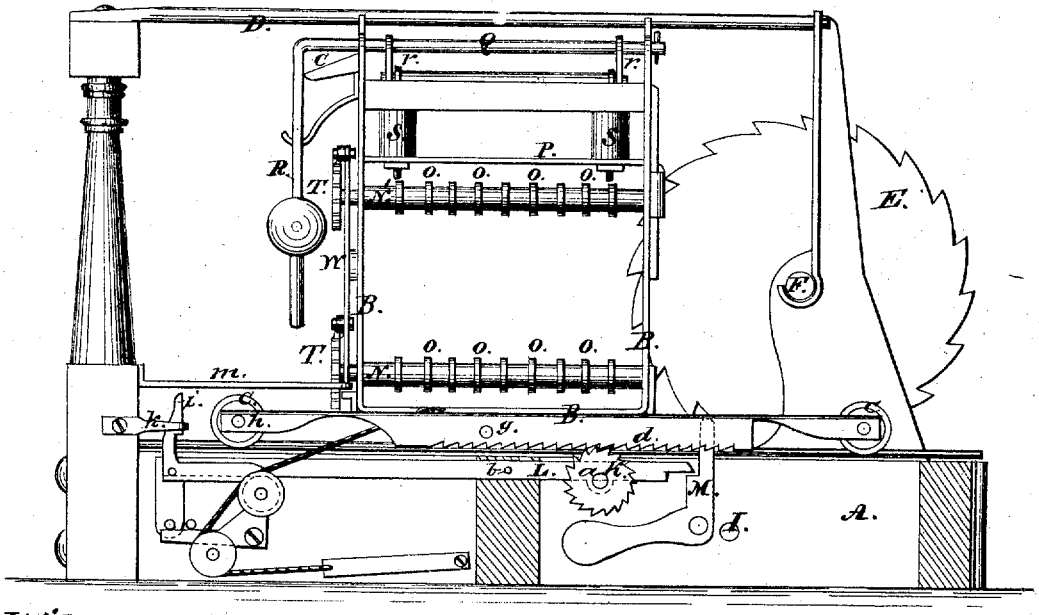
Figure 3:
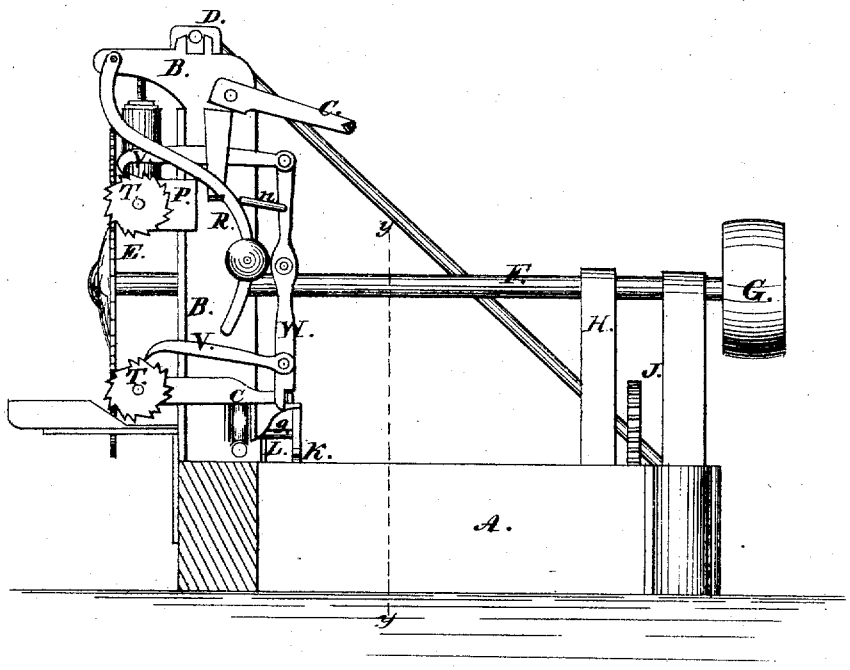

Figure 1 is a front elevation, Fig. 2, a back elevation; Fig. 3, an end sectional view.

Similar letters in each of the drawings indicate like parts.

A is the frame of the machine, supporting the carriage B, which runs upon the wheels C C. This carriage stands vertically, its upper edge being grooved, and supported by this or other equivalent device on the rod D. E is the saw, F its arbor, and G the driving-pulley.

By means of a belt, H, motion is communicated to the shaft I, (shown in section in Fig. 3,) and, through the gear-wheel J, Fig. 3, gives motion to the shaft *a*, supporting the pinion K. The end of the shaft *a* turns in a box in the bar L, one end of which is supported by a notch in the bent lever M, and the other end turns about a pivot at *b*.

N N′ are feed-shafts extending across the frame or carriage B. Upon the shafts are placed the holding-rings O O, these being slipped on the shaft with collars or washers between them, and the whole screwed up tight. The lower feed-shaft is firmly attached to the carriage B, and the upper one, N′, is attached to the sliding frame P, so that it can be moved nearer to, or farther from, the roller N. A shaft, Q, extends across the top of the carriage, having attached to one end the loaded lever R, which, by its weight, acting upon the short arms *r r*, also attached to the shaft, keeps the sliding frame B and its roller N′ firmly pressed down upon the block which is to be sawed. Elastic springs S S form the connection between the levers *r r* and the frame P, so that if the block should not have its faces exactly parallel on placing it between the feed-rollers these springs would give, thus causing the rollers to press equally from one end to the other, and hold it firmly. In order to feed the blocks forward, ratchet-wheels T T are attached to each feed-shaft, which are operated by the pawls V V, these pawls being connected by the vibrating arm W, so as to act simultaneously.

In operating my machine, the lever R is raised and caught over the catch *c*, the block inserted between the rollers N N′, and the lever B dropped, its weight holding the block firmly. The machine being in motion, the pinion K engages the rack *d* on the carriage, and moves it toward the saw until the shingle is severed. As it reaches the end, a pin, *g*, in the carriage comes in contact with the bent lever M, pressing it back, and allowing the end of the bar L to fall out of the notch in M, and thus, by its weight, dropping the pinion out of contact with the rack *d*. A spring or weight connected with the back end of the carriage draws it immediately back, where the pin *h* strikes the lever *i* and disengages it from the arm *k*, where it was hooked at the moment the pinion K dropped out of contact with *d*. This last movement again throws the pinion K into contact with the rack *d*, when the carriage again moves forward. As the carriage goes back the end of the lever or arm W comes in contact with the fixed inclined arm *m*, which pushes it forward, thus moving the feed-rollers, alternately, a short tooth and a long one, so that every other shingle is cut with the butt down, and every other one with the butt up. The spring *n* draws the arm W back each time for a new motion after leaving the arm *m*. When a block is entirely used up the lever R falls of its own weight, and catches in the hook *c′*.

Some of the advantages to be gained by my improved machine are, first, that it is very easily attended, being compact, and all parts easy to reach; second, the carriage being upright, and running on only two wheels, beside occupying less room, has no side draft, as it were, the motive power being nearly in a line with the resistance, and not as much friction; third, by my improved mode of holding the blocks to be cut much time is saved in adjusting them, as the weighted lever may be raised and rested upon the arm *c* till the block is in place, when it may be dropped, its weight holding the block firmly. The elastic springs render it easily adjustable, while the whole mechanism works so much easier that it will cut nearly a third more shingles, and with less labor, than other machines.

Having described this my invention, what I claim, and desire to secure by Letters Patent, is—

1. An elastic spring, *s s*, interposed between the tension-weight and feed-roller N′, substantially as and for the purpose set forth.

2. The springs *s s*, arms *r r*, rock-shaft Q, and weighted lever R, in combination with a feed-roller, N′, of a shingle-machine, substantially as described.

3. In combination with the carriage B and lever R, the catches *c c′*, for holding the weighted lever, as set forth.

FRANK A. HUNTINGTON.

Witnesses:

RICHD. K. EVANS,
H. C. TOWNSEND.